United States Patent
Stevenson

(10) Patent No.: US 6,827,386 B2
(45) Date of Patent: Dec. 7, 2004

(54) DOUBLE PIVOTING TAILGATE

(75) Inventor: Robin Stevenson, Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/431,720

(22) Filed: May 8, 2003

(65) Prior Publication Data

US 2004/0222656 A1 Nov. 11, 2004

(51) Int. Cl.[7] .......................................... B60D 25/00
(52) U.S. Cl. ................................. 296/51; 296/56
(58) Field of Search ................. 296/51, 57.1, 100.06, 296/61, 56, 122; 406/23; 414/408, 502

(56) References Cited

U.S. PATENT DOCUMENTS

| | | | | |
|---|---|---|---|---|
| 304,168 A | * | 8/1884 | Byers | 296/51 |
| 1,035,901 A | * | 8/1912 | Ping | 296/51 |
| 1,214,045 A | * | 1/1917 | Lightburne | 296/51 |
| 1,371,036 A | * | 3/1921 | Le Force | 296/51 |
| 1,422,962 A | * | 7/1922 | Goss et al. | 296/51 |
| 1,531,212 A | * | 3/1925 | Newman | 296/51 |
| 1,828,797 A | * | 10/1931 | Becker | 296/51 |
| 2,645,522 A | * | 7/1953 | Kersey | 296/51 |
| 2,742,317 A | * | 4/1956 | Chandler | 296/51 |
| 2,806,735 A | * | 9/1957 | Smith | 296/51 |
| 2,951,726 A | * | 9/1960 | Ackerman | 296/51 |
| 3,612,601 A | * | 10/1971 | Himka et al. | 296/51 |
| 3,938,793 A | | 2/1976 | Kaptanis et al. | 267/120 |
| 4,024,671 A | * | 5/1977 | Isobe | 296/51 |
| 4,121,725 A | * | 10/1978 | Demenais | 296/122 |
| 4,585,265 A | * | 4/1986 | Mader | 296/56 |
| 4,691,956 A | * | 9/1987 | Hodge | 296/51 |
| 5,252,008 A | * | 10/1993 | May et al. | 406/23 |
| 5,299,787 A | | 4/1994 | Svensson | 267/64.12 |
| 5,320,397 A | | 6/1994 | Peterson et al. | 296/57.1 |
| 5,468,037 A | | 11/1995 | Peterson et al. | 296/57.1 |
| 5,518,158 A | * | 5/1996 | Matlack | 296/51 |
| 5,690,465 A | * | 11/1997 | Ledwell | 414/408 |
| 5,954,383 A | | 9/1999 | Beck et al. | 296/50 |
| 6,126,222 A | | 10/2000 | Nguyen et al. | 296/56 |
| 6,179,361 B1 | | 1/2001 | Sailors | 296/50 |
| 6,386,818 B1 | * | 5/2002 | Reed | 414/502 |
| 2003/0122396 A1 | * | 7/2003 | Humphrey et al. | 296/51 |

* cited by examiner

*Primary Examiner*—Kiran Patel
(74) *Attorney, Agent, or Firm*—Laura C. Hargitt

(57) ABSTRACT

A tailgate assembly is provided for use with a utility vehicle having a cargo area formed by first and second sidewalls and a bed floor, with a tailgate opening at a rear end of the cargo area. The tailgate assembly includes a tailgate positioned in the tailgate opening. The tailgate is pivotally connected to the sidewalls along upper and lower axes to facilitate pivotal movement about the lower axis to a lowered position extending the bed floor, and pivotal movement about the upper axis to a raised position. At least one load assist mechanism is connected to the tailgate to provide a force to assist pivotal movement to the raised position.

11 Claims, 6 Drawing Sheets

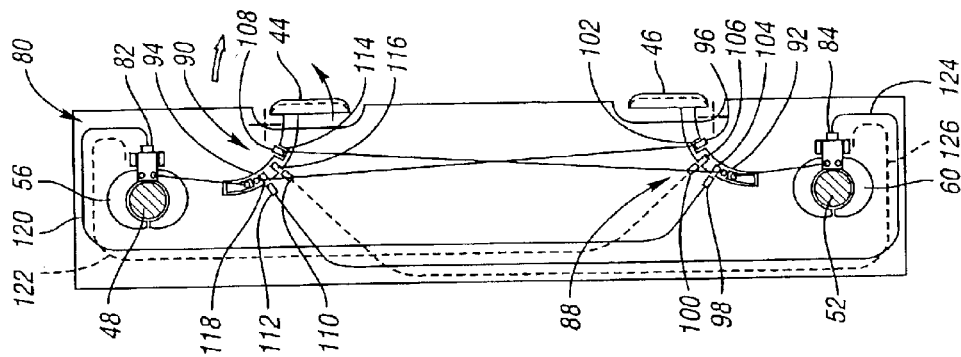
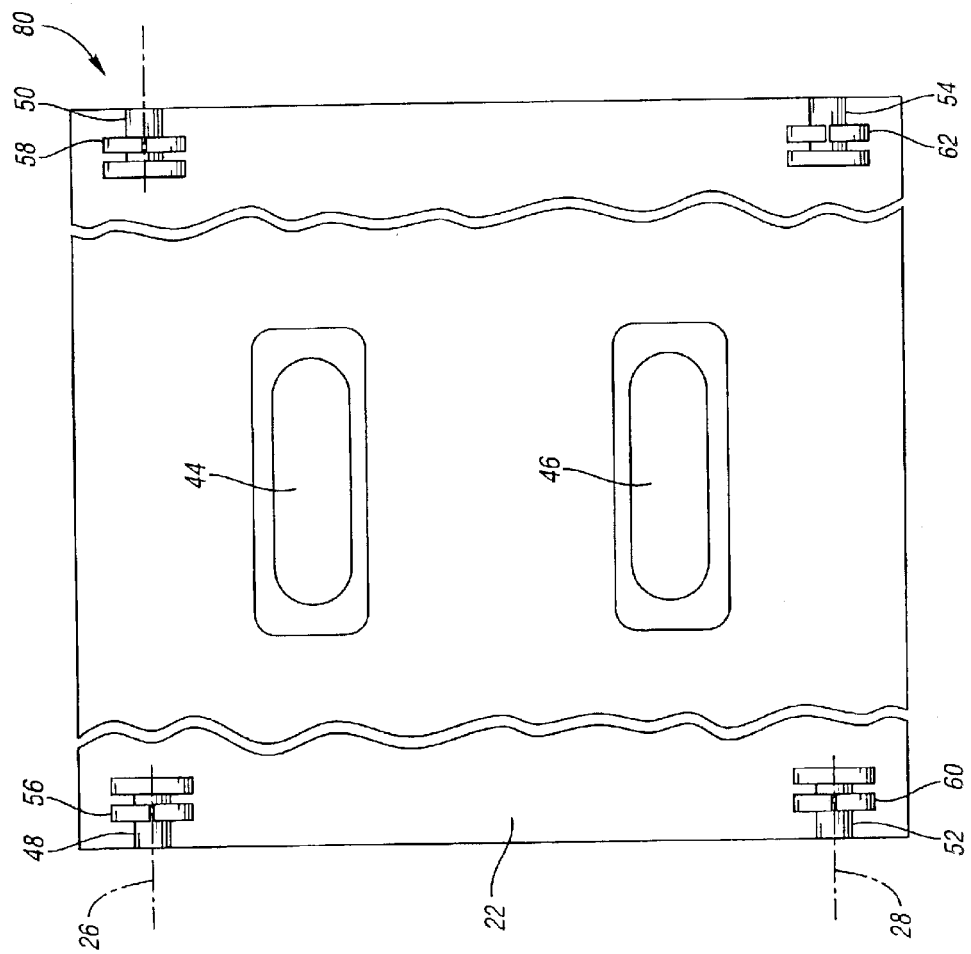

DOUBLE PIVOTING TAILGATE

TECHNICAL FIELD

The present invention relates to a tailgate assembly which is pivotable about a lower axis to a lowered position and pivotable about an upper axis to a raised position, with a load assist mechanism providing a force to assist pivotal movement to the raised position.

BACKGROUND OF THE INVENTION

Traditionally, pickup truck tailgates are hinged at the bottom and open downward, since in a typical open bed pickup truck there is no restriction on the size of the item which can be loaded except for any restriction imposed by the load opening. If the tailgate were hinged at the top, as in many sport utility vehicles, the maximum dimension of any object loaded from the rear would be defined by the opening created by the width and height of the rear opening of the bed. By pivoting the tailgate from the bottom, the dimensions of items to be loaded from the rear is limited only by the width of the bed.

Certain newer pickup truck derivative vehicles provide a tailgate release handle at a height greater than four feet, which may be uncomfortably positioned for shorter individuals. It is desirable to provide a pickup truck derivative vehicle with improved ease of operation and functionality.

SUMMARY OF THE INVENTION

In vehicles with integral cargo covers or in pickup trucks equipped with after market cargo covers, the tailgate load opening is defined by the width of the bed and by the height of the bed (i.e., the height of the cargo cover), which is approximately equal to the height of the tailgate. Thus, unless the cargo cover is removed or raised, the load opening is already restricted so a top hinged tailgate may be provided without adversely affecting loading. Accordingly, the invention provides a tailgate hinged at the top and the bottom for use with vehicles having a cargo cover. Preferably, the tailgate is supported by gas struts to provide a load assist force for raising the tailgate.

More specifically, the invention provides a tailgate assembly for use with a utility vehicle having a cargo area formed by first and second sidewalls and a bed floor, with a tailgate opening at a rear end of the cargo area and a cargo cover over the cargo area. The tailgate assembly includes a tailgate positioned in the tailgate opening. The tailgate is pivotally connected to the sidewalls along upper and lower axes to facilitate pivotal movement about the lower axis to a lowered position extending the bed floor and pivotal movement about the upper axis to a raised position. At least one load assist mechanism is connected to the tailgate to provide a force to assist the pivotal movement to the raised position.

An upper handle is positioned on the tailgate to actuate pivotal movement about the lower axis and a lower handle is positioned on the tailgate to actuate pivotal movement about the upper axis.

An interlock assembly is configured to prevent unwanted simultaneous actuation of the upper and lower handles. The upper and lower handles are operatively connected to upper and lower latches which are releaseably engageable with strikers on the sidewalls. The interlock assembly includes a moveable sensor plunger on each latch which senses engagement with the respective striker. Each sensor plunger is operatively connected with a linkage to selectively prevent actuation of one of the handles, depending upon the sensed condition of the respective latch.

Each linkage includes a curved rack connected to the respective handle for movement therewith, a plurality of blockers engageable with slots formed in the rack, and cables connecting the blockers to the sensor plungers to actuate movement of the blockers to selectively prevent handle actuation.

Each curved rack includes a lost motion slot with a follower in the lost motion slot. Each follower is operatively connected to the respective latch for disengaging the latch when the handle is actuated. The lost motion slot allows the blockers on the opposite curved rack to move into a blocking position before the latch is disengaged, thereby preventing simultaneous disengagement of all latches.

Tethers are connected between the sidewalls and the tailgate for supporting the tailgate in the lowered position.

The load assist mechanism includes gas springs which are pivotally connected to the bed floor. The gas springs may be connected to the bed floor closely adjacent the lower axis, or they may be connected to the bed floor away from the tailgate opening and rest flat in a floor recess when the tailgate is closed.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 5a shows a schematic rear view of the tailgate assembly of the invention;

FIG. 5b shows a schematic side view of the tailgate assembly of FIG. 5a with the latches closed;

DESCRIPTION OF THE PREFERRED EMBODIMENTS

Figure 1:
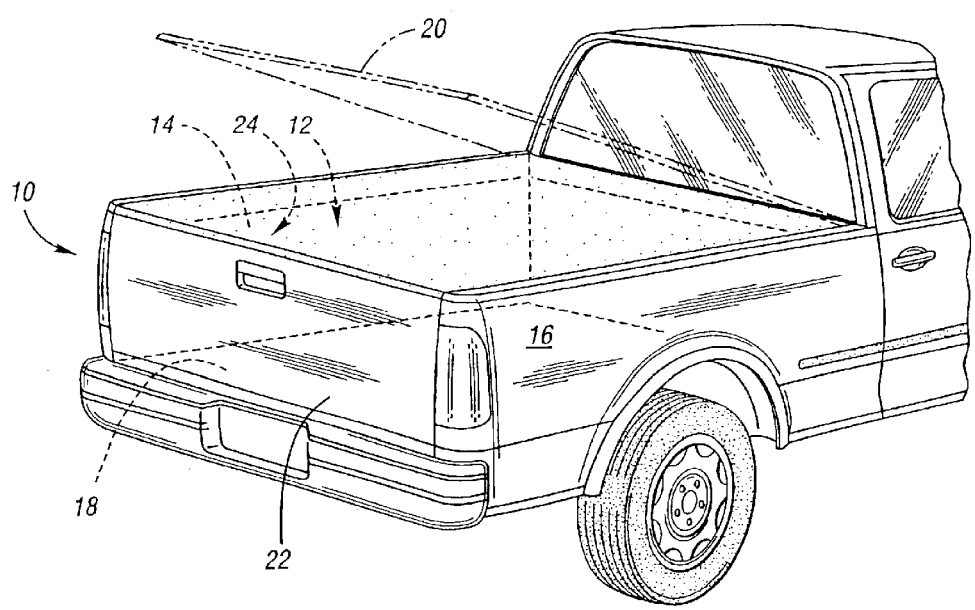
FIG. 1 shows a partial rear perspective view of a pickup truck incorporating a tailgate assembly in accordance with the invention.

Referring to FIG. 1, a pickup truck 10 is shown, including a cargo area 12 formed by first and second sidewalls 14, 16, and a bed floor 18. The cargo area 12 is covered by a cargo cover 20, and a tailgate 22 is positioned in the tailgate opening 24 at the rear end of the cargo area 12.

Figure 2A:
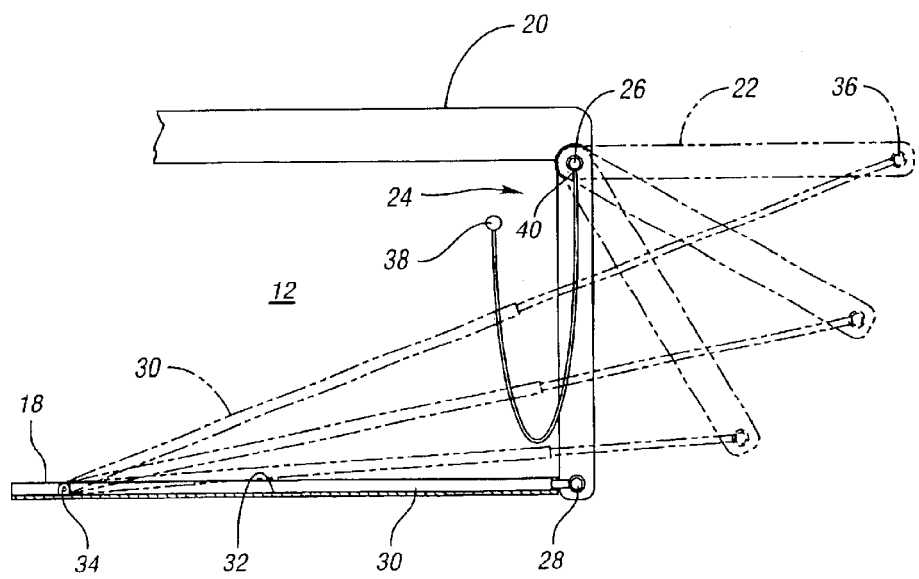
FIG. 2a shows a schematic side view of the tailgate assembly of FIG. 1 pivoting to the raised position.

FIG. 2a is a side schematic illustration of the tailgate 22 pivotally connected in the tailgate opening 24. As shown, the tailgate 22 is pivotally connected to the sidewalls 14, 16 about upper and lower pivot axes 26, 28. As illustrated in FIG. 2a, the tailgate 22 may pivot from the vertical position to the raised position about the upper pivot axis/joint 26. During this pivotal movement, the gas spring 30 provides a load assist force to assist the operator in raising the tailgate 22 to the raised position. By way of example, the gas spring(s) or gas strut(s) 30 may be embodied as described in U.S. Pat. Nos. 4,382,311; 4,813,100; 4,815,163; 4,925,830; 5,331,718; or 6,126,222, each of which is hereby incorporated by reference. The gas strut 30 is preferably a compression strut which is always trying to expand. Two such gas struts 30 are preferably provided at opposing ends of the tailgate 22.

As shown in FIG. 2a, when the tailgate 22 is in the vertical, closed position, the gas strut 30 rests within a floor recess 32 formed in the bed floor 18.

Figure 2B:
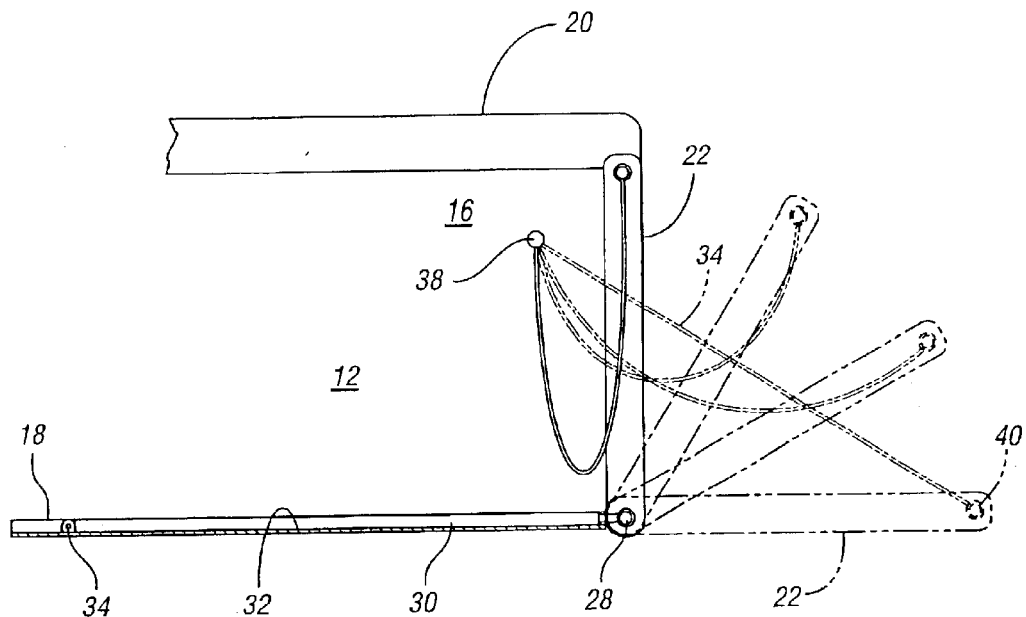
FIG. 2b shows a schematic side view of the tailgate assembly of FIG. 1 pivoting to the lowered position.

Turning to FIG. 2b, pivotal movement of the tailgate 22 about the lower axis/pivot joint 28 is illustrated. As shown, the tailgate 22 is pivotable from the upright, closed position to the lowered position extending the body floor 18. In the lowered position, the tailgate 22 is supported by the tether 34 which is connected between attachment points 38, 40. FIG. 2b also illustrates the positioning of the gas strut 30 in the recess 32 of the bed floor 18. As illustrated, the gas strut 30 is preferably recessed below the top surface of the bed floor 18. The gas strut 30 may alternatively be mounted to the sidewalls, rather than the bed floor. The opposing end of the gas strut 30 is pivotally connected to the tailgate 22 at the pivot joint 28.

Figure 3A:
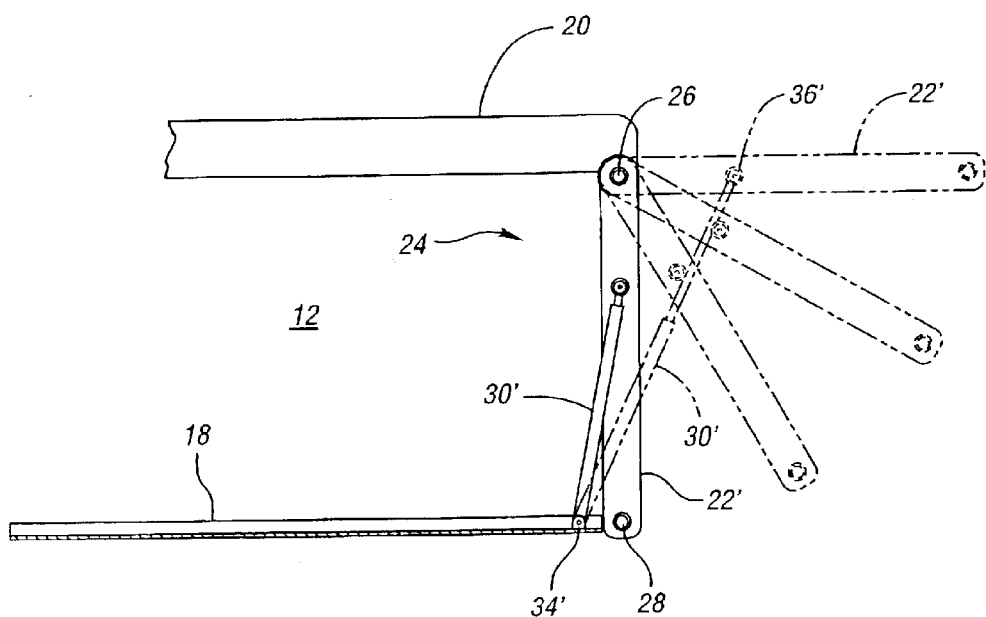
FIG. 3a shows a schematic side view of an alternative tailgate assembly pivoting to a raised position.
Figure 3B:
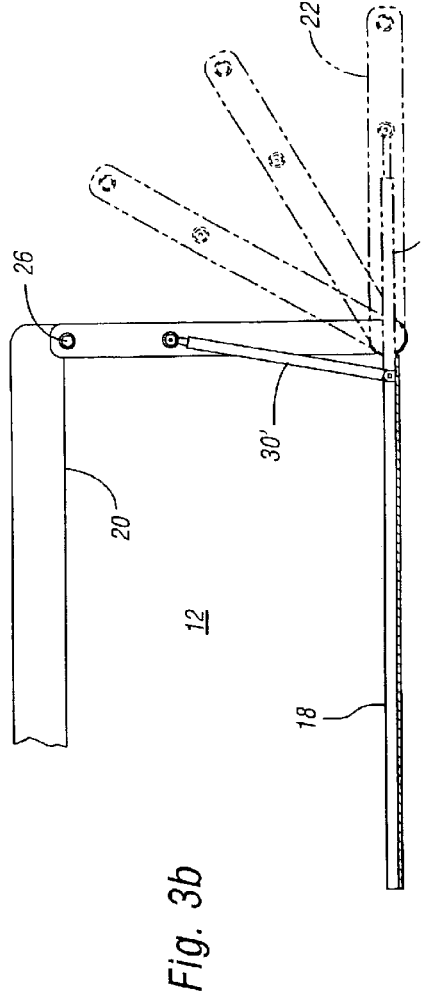
FIG. 3b shows a schematic side view of the tailgate assembly of FIG. 3a pivoting to the lowered position.

Turning to FIGS. 3a and 3b, an alternative tailgate assembly is shown, wherein like reference numerals refer to like components from FIGS. 2a and 2b. As illustrated, the tailgate 22' is pivotally connected in the tailgate opening 24 about upper and lower pivot axes 26, 28. FIG. 3a illustrates pivotal movement of the tailgate 22' about the upper pivot axis 26 from the vertical position to the raised, horizontal position. FIG. 3b illustrates pivotal movement of the tailgate 22' from the vertical, closed position to the lowered position extending the bed floor 18. The embodiment of FIGS. 3a and 3b differs from that of FIGS. 2a and 2b in that the gas strut 30' is pivotally connected about the pivot joint 34' which is closely adjacent the lower pivot joint 28 of the tailgate 22. Accordingly, the gas strut 30' is shorter than the gas strut 30 shown in FIGS. 2a and 2b. The gas strut 30' is pivotally connected to the tailgate 22' at the pivot joint 36' to provide an assist force in raising the tailgate 22' to the raised position shown in FIG. 3a.

Accordingly, FIGS. 2a and 3a illustrate that the tailgates 22, 22' can be raised to an upright position to expose the tailgate opening 24 for loading and unloading of the cargo area 12. FIGS. 2b and 3b illustrate that the same tailgates 22, 22' may be pivoted about the respective lower pivot joint to the lowered, horizontal position.

Figure 4:
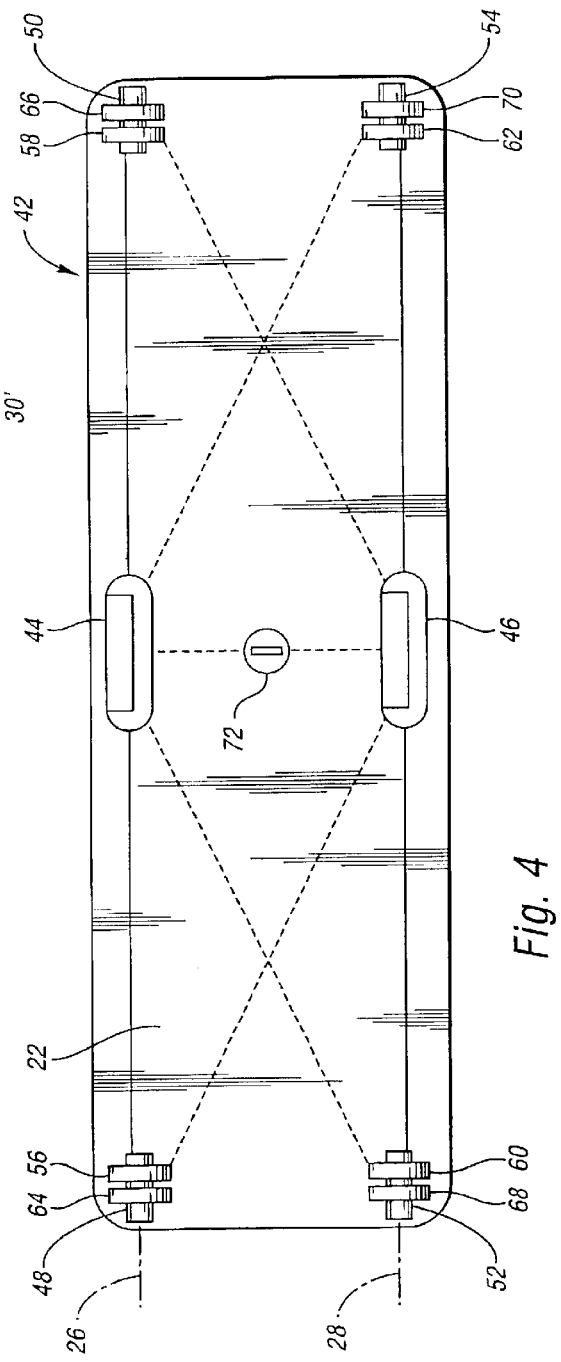
FIG. 4 shows a schematic rear view of the tailgate assembly of the invention.

Turning to FIG. 4, a schematic plan view of the tailgate assembly 42 is shown including the tailgate 22 and upper and lower handles 44, 46. The tailgate assembly 42 includes strikers 48, 50, 52, 54 which form the upper and lower pivot axes 26, 28 about which the tailgate 22 pivots. The strikers 48, 50, 52, 54 are supported by the sidewalls of the truck bed. The tailgate 22 is connected to the strikers 48, 50, 52, 54 by the latches 56, 58, 60, 62. Also, sensors 64, 66, 68, 70 are provided to sense the engaged or disengaged condition of the latches 56, 58, 60, 62. The sensed conditions of the latches 56, 58, 60, 62 are communicated with the opposite handles 44, 46 to prevent both handles 44, 46 from being actuated at the same time. An optional lock 72 may be provided to selectively allow actuation of both handles 44, 46 to remove the tailgate 22 from the vehicle.

The sensors 64, 66, 68, 70 may be electrical sensors which send control signals to solenoids associated with the handles 44, 46 which act to block movement of the handles 44, 46 when the solenoids are actuated. Accordingly, by way of example, if the sensors 64, 66 sense that the latches 56, 58 are disengaged, a corresponding signal may be sent to the solenoid associated with the handle 46 to prevent actuation of the handle 46. Similarly, if the sensors 68, 70 sense that the latches 60, 62 are unlatched, then signals may be sent to the solenoid associated with handle 44 to prevent actuation of the handle 44.

Figure 5C:
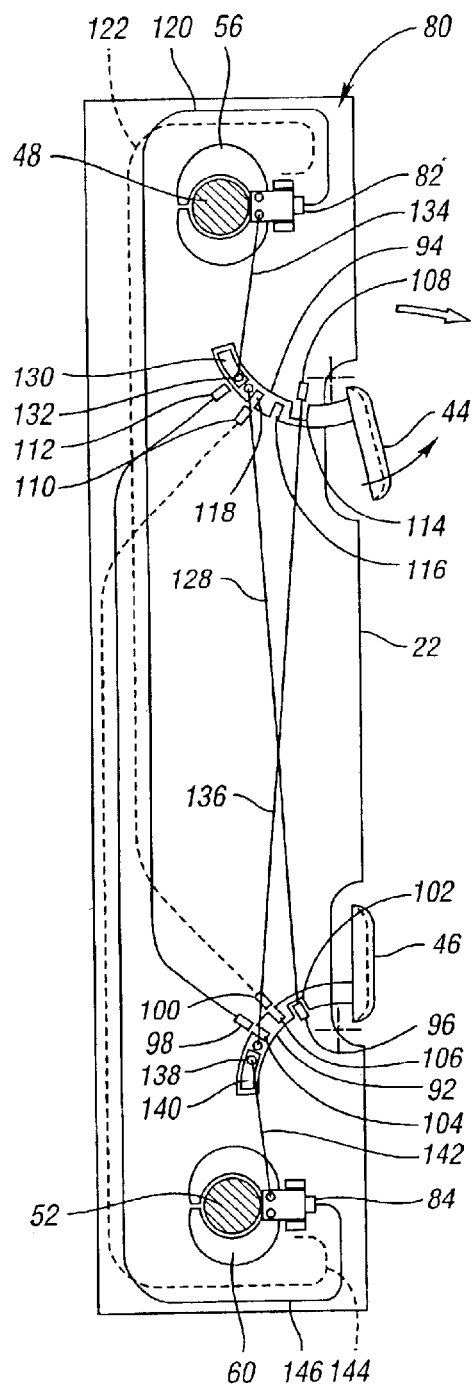
FIG. 5c shows a schematic side view of the tailgate assembly of FIG. 5b with handle rotation initiating.

Alternatively, a mechanical interlock assembly 80 may be provided as shown schematically in FIGS. 5a–6b. As shown in FIG. 5a, wherein like reference numerals are used to refer to like components from FIG. 4, the latches 56, 58, 60, 62 engage the strikers 48, 50, 52, 54, respectively, to secure the tailgate 22. The interlock assembly 80 as shown in FIGS. 5a–d is configured to prevent unwanted simultaneous actuation of the upper and lower handles 44, 46. The upper handle 44 is operatively connected to the latches 56, 58 to selectively disengage the latches 56, 58 for selective pivotal movement of the tailgate 22 about the lower axis 28, and the lower handle 46 is operatively connected to the latches 60, 62 to selectively disengage the latches 60, 62 to allow pivotal movement about the upper axis 26 by releasing the latches 60, 62 from the strikers 52, 54 respectively.

Referring to FIG. 5b, the interlock assembly 80 includes moveable sensor plungers 82, 84 on each of the latches 56, 60 which are engaged with linkages 88, 90. The sensor plungers 82, 84 sense engagement of the latches 56, 60 with the respective striker 48, 52. Each plunger 82, 84 is operatively connected with one of the linkages 88, 90 to selectively prevent actuation of one of the handles 44, 46 depending upon the sensed condition of the respective latches 56, 60.

Each linkage 88, 90 includes a curved rack 92, 94 connected to the respective handle 46, 44 for movement therewith. A plurality of blockers 96, 98, 100 are engageable with slots 102, 104, 106 formed in the curved rack 92. Similarly, blockers 108, 110, 112 are selectively engageable with the slots 114, 116, 118 in the curved rack 94. The cable 120 operatively connects the sensor 82 to the blocker 98, and the cable 122 operatively connects the corresponding sensor on the opposite latch 58 (shown in FIG. 5a) to the blocker 100. Similarly, the cable 124 operatively connects the sensor plunger 84 with the blocker 112, and the cable 126 operatively connects the sensor plunger on the opposite latch 60 with the blocker 110. Preferably, the blockers 98, 100, 110, 112 are spring-biased into locking engagement with the respective slots 104, 106, 116, 118, but tension in the cables 120, 122, 124, 126 prevents the blockers 98, 100, 110, 112 from entering the slots when the tailgate is closed. However, when the sensors 82, 84 sense that the latches 56, 60 are opening, the respective cable loosens as a result of movement of the plungers 82, 84, and the spring bias of the blockers moves the blockers 98, 100, 110, 112 into locking engagement with the respective slots 104, 106, 116, 118 to prevent actuation of the respective handle 44, 46. This operation will be described in greater detail with reference to FIGS. 5c–d.

Referring to FIG. 5c, initial actuation of the upper handle 44 causes the curved rack 94 to start pivoting (to the right)

with the handle 44. As a result of this initial pivoting movement, slack is created in the cable 128 which allows the spring biased blocker 96 to enter the slot 102, thereby preventing movement of the rack 92 and handle 46. As shown, the rack 94 includes a lost motion slot 130 and follower 132. The follower 132 is operatively connected with the latch 56 by the cable 134 to cause the latch 56 to open. After the initial pivotal movement or lost motion of the follower 132 within the slot 130, the follower 132 hits the top of the slot 130 and begins to pull the cable 134 down to disengage the latch 56 to release the striker 48 to allow pivotal movement about the lower striker 52. Simultaneously, another cable is disengaging the latch 58 at the opposite end of the tailgate 22 while the lower latches 60, 62 remain engaged.

Figure 5D:
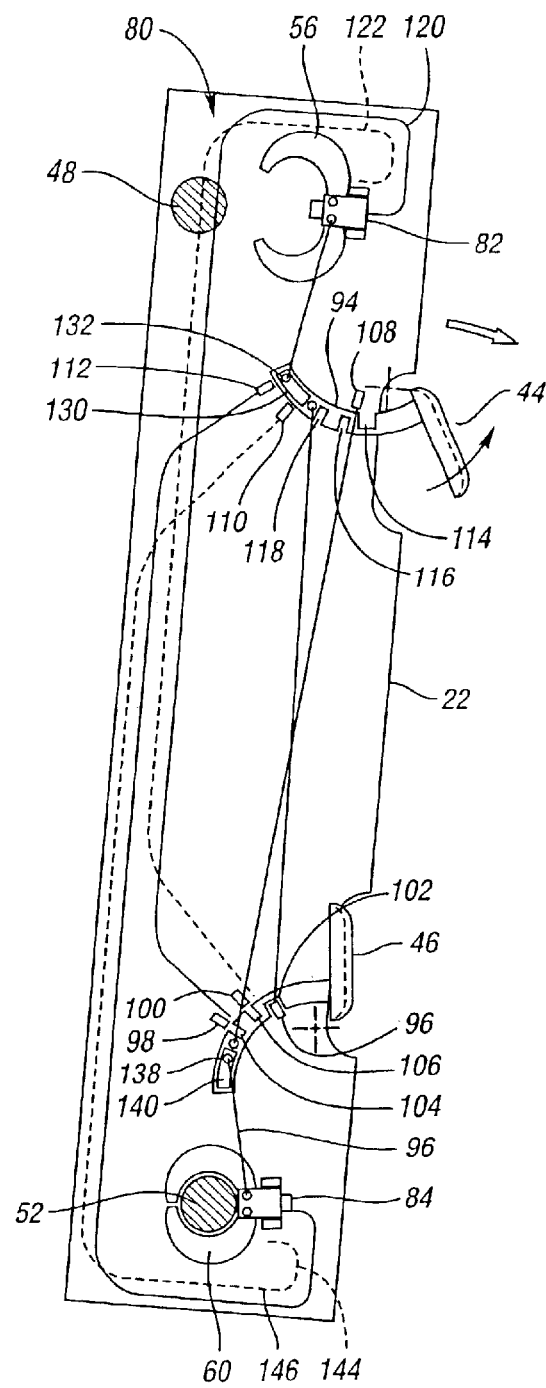
FIG. 5d shows a schematic side view of the tailgate assembly of FIG. 5c with the upper latches disengaged.

FIG. 5d illustrates that further pivotal movement of the handle 44 pivots the rack 94 sufficiently so that the cable 134 causes disengagement of the clamp 56 from the striker 48 to allow pivotal movement of the tailgate 22 about the lower strikers 52, 54 as shown. With the handle 44 pivoted fully out, sufficient slack exists in the cables 120, 122 to allow the blockers 98, 100 to enter the respective slots 104, 106 and the rack 92 to prevent actuation of the lower handle 46.

Actuation of the handle 46 when the tailgate 22 is in the upright, closed position results in a mirror image of the linkage movements described above regarding movement of the handle 44. Initial pivotal movement of the handle 46 would cause the cable 136 to loosen, which would enable the blocker 108 to enter the slot 114 to prevent pivotal movement of the rack 94 and upper handle 44. Further pivotal movement of the handle 46 would cause the follower to bottom out at the end of the lost motion slot 140, and the cable 142 would actuate disengagement of the latch 60 to allow pivotal movement of the tailgate 22 with respect to the upper pivot axis 26. As the clamp 60 is opening, the cables 144, 146 sense the opening of the sensor plunger 84, which causes slack in the cables 144, 146 and allows the spring loaded blockers 110, 112 to enter the respective slots 116, 118 to lock the rack 94 and handle 44 in the closed position.

Figure 6A:
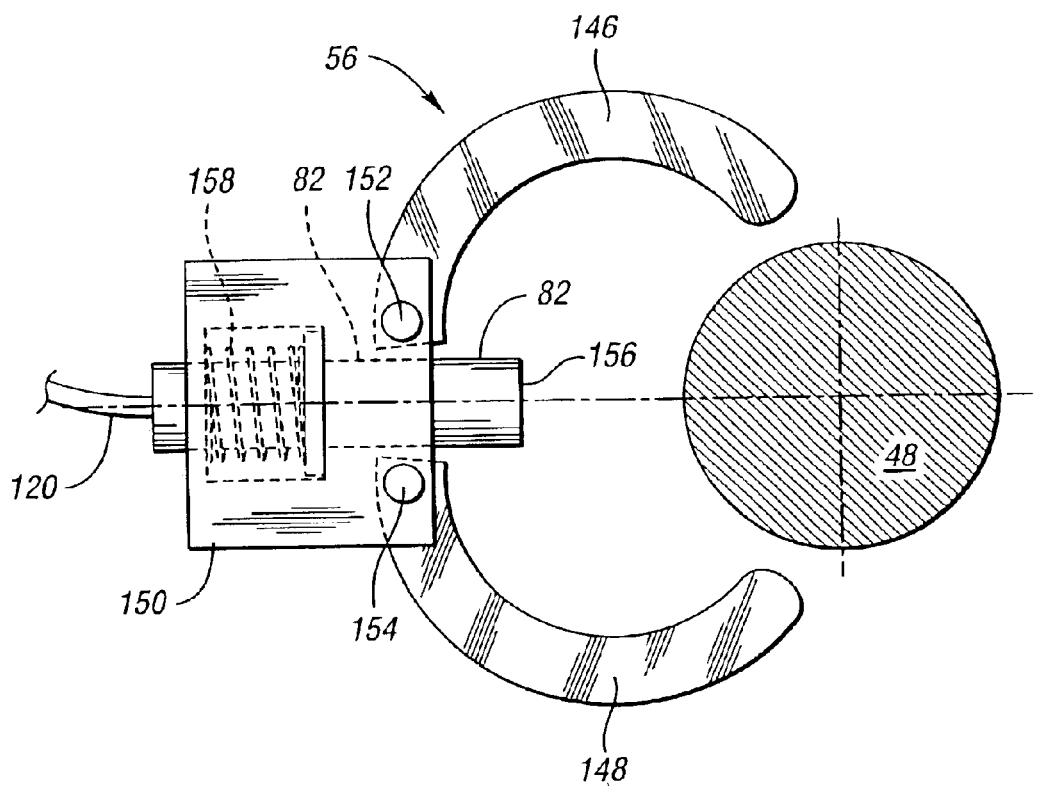
FIG. 6a shows a schematic sectional view of a latch prior to engagement with a striker in accordance with FIGS. 5a–d.
Figure 6B:
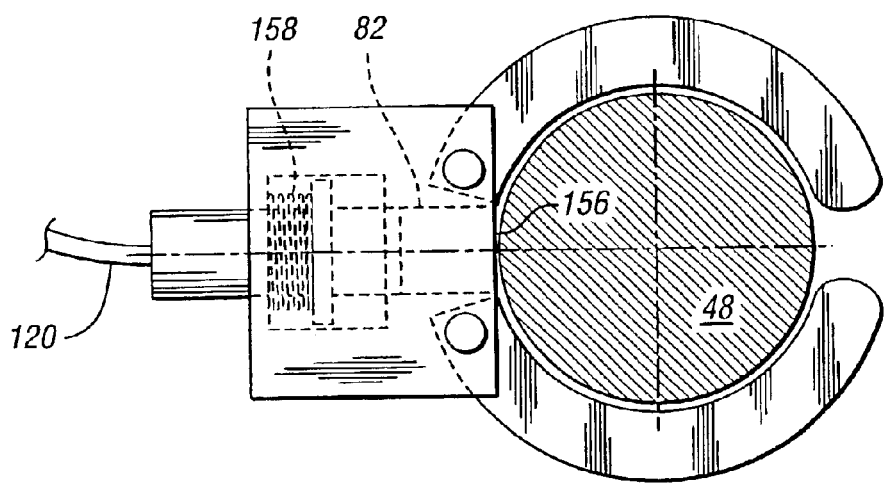
FIG. 6b shows a schematic sectional view of the latch of FIG. 6a engaged with the striker.

FIGS. 6a and 6b show enlarged schematic illustrations of a latch 56 including clamp arms 146, 148 which are pivotally connected to a base 150 on the tailgate at pivot joints 152, 154 for selectively engaging the striker 48. The sensor plunger 82 has a distal end 156 which contacts the striker 48 when the arms 146, 148 are closed around the striker 48, thereby moving the sensor plunger 82 axially against the bias of the spring 158. This movement of the sensor plunger 82 releases slack in the cable 120 to allow the blocker 98, shown in FIG. 5d, to enter the slot 104 as a result of its spring bias.

Accordingly, the above described interlock assembly 80 provides communication between the actuating handles 44, 46 for the two operating modes of the tailgate 22 to ensure that all latches are engaged before one set of latches is released. The interlock assembly 80 assures that only one release handle is being operated at a time. The upper and lower release handles are therefore "aware" of the position of the opposing latches which will act as hinges for the actuated handle. This mechanical system is preferred over the electrical system since it will operate even if vehicle electric power is interrupted and it avoids the need to reliably convey electric power to a removable tailgate.

While the best modes for carrying out the invention have been described in detail, those familiar with the art to which this invention relates will recognize various alternative designs and embodiments for practicing the invention within the scope of the appended claims.

What is claimed is:

1. A tailgate assembly for use with a vehicle having a cargo area formed by first and second sidewalls and a bed floor, with a tailgate opening at a rear end of the cargo area, the tailgate assembly comprising:

a tailgate positioned in the tailgate opening, said tailgate being pivotally connected to the sidewalls along upper and lower axes to facilitate pivotal movement about the lower axis to a lowered position extending the bed floor and pivotal movement about the upper axis to a raised position; and at least one load assist mechanism connected to the tailgate and including a compression strut which is always trying to expand to provide a force to assist said pivotal movement to the raised position and which is recessed below the top surface of said bed floor when the tailgate is in the lowered position.

2. A tailgate assembly for use with a vehicle having a cargo area formed by first and second sidewalls and a bed floor, with a tailgate opening at a rear end of the cargo area, the tailgate assembly comprising:

a tailgate positioned in the tailgate opening, said tailgate being pivotally connected to the sidewalls along upper and lower axes to facilitate pivotal movement about the lower axis to a lowered position extending the bed floor and pivotal movement about the upper axis to a raised position;

at least one load assist mechanism connected to the tailgate to provide a force to assist said pivotal movement to the raised position: and an upper handle on the tailgate to actuate pivotal movement about the lower axis and a lower handle on the tailgate to actuate pivotal movement about the upper axis.

3. The tailgate assembly of claim 2, further comprising an interlock assembly configured to prevent unwanted simultaneous actuation of said upper and lower handles.

4. The tailgate assembly of claim 3, wherein said upper and lower handles are operatively connected to upper and lower latches which are releasably engageable with strikers on the sidewalls.

5. The tailgate assembly of claim 4, wherein said interlock assembly includes:

said latches each having a movable sensor plunger which senses engagement with the respective striker, each sensor plunger being operatively connected with a linkage to selectively prevent actuation of one of the handles depending upon the sensed condition of the respective latches.

6. The tailgate assembly of claim 5, wherein each linkage includes:

a curved rack connected to the respective handle for movement therewith;

a plurality of blockers engageable with slots formed in the rack; and cables connecting the blockers to said sensor plungers to actuate movement of the blockers to selectively prevent handle actuation.

7. The tailgate assembly of claim 6, wherein each curved rack includes a lost-motion slot with a follower in the lost-motion slot, each follower operatively connected to the respective latch for disengaging the latch when the handle is actuated, wherein said lost-motion slot allows said blockers on the opposite curved rack to move into a blocking position before the latch is disengaged, thereby preventing simultaneous disengagement of all latches.

8. The tailgate assembly of claim 1, further comprising at least one tether connected between the sidewalls and the tailgate for supporting the tailgate in said lowered position.

9. The tailgate assembly of claim 2, wherein said load assist mechanism comprises at least one gas spring connected to the bed floor.

10. The tailgate assembly of claim 9, wherein said at least one gas spring is connected to the bed floor closely adjacent said lower axis.

11. The tailgate assembly of claim 9, wherein said at least one gas spring is connected to the bed floor away from the tailgate opening and rests flat in a floor recess when the tailgate is closed.

* * * * *